US012607241B2

(12) United States Patent
Yoon

(10) Patent No.: US 12,607,241 B2
(45) Date of Patent: Apr. 21, 2026

(54) BRAKE DEVICE

(71) Applicant: HYUNDAI MOBIS CO., LTD., Seoul (KR)

(72) Inventor: Bo Ram Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 391 days.

(21) Appl. No.: 18/210,942

(22) Filed: Jun. 16, 2023

(65) Prior Publication Data

US 2024/0344576 A1    Oct. 17, 2024

(30) Foreign Application Priority Data

Apr. 17, 2023    (KR) ........................ 10-2023-0050287

(51) Int. Cl.
| *F16D 65/18* | (2006.01) |
| *F16D 55/22* | (2006.01) |
| *F16D 65/00* | (2006.01) |
| *F16D 125/40* | (2012.01) |
| *F16D 125/64* | (2012.01) |

(52) U.S. Cl.
CPC .......... *F16D 65/18* (2013.01); *F16D 2125/40* (2013.01); *F16D 2125/64* (2013.01)

(58) Field of Classification Search
CPC ............. F16D 2125/06; F16D 2125/04; F16D 65/847; F16D 65/008; F16D 2055/0091; F16D 55/226; F16D 65/183; F16D 2125/64; F16D 2125/40; F16D 65/18
See application file for complete search history.

(56) References Cited

U.S. PATENT DOCUMENTS

| 4,804,073 A * | 2/1989 | Taig ........................ F16D 65/18 |
| | | 475/342 |
| 6,554,109 B1 * | 4/2003 | Olschewski ............ F16H 25/24 |
| | | 188/162 |
| 8,205,725 B2 * | 6/2012 | Sakashita .............. F16D 65/568 |
| | | 188/162 |
| 10,823,242 B2 * | 11/2020 | Choi ...................... B60T 13/741 |
| 11,131,354 B1 * | 9/2021 | Gerber .................... F16D 65/56 |
| 11,339,842 B2 | 5/2022 | Al-Mahshi |

(Continued)

FOREIGN PATENT DOCUMENTS

| DE | 102009013005 B3 * | 8/2010 | ........... F16D 65/183 |
| DE | 10 2022 120 333 A1 | 2/2023 | |
| JP | 2010-025222 A | 2/2010 | |

OTHER PUBLICATIONS

DE-102009013005-B3 English translation (Year: 2010).*
Extended European Search Report issued in corresponding European Patent Application No. 23183660.2 dated Dec. 20, 2023.

*Primary Examiner* — Robert A. Siconolfi
*Assistant Examiner* — James K Hsiao
(74) *Attorney, Agent, or Firm* — Morgan Lewis & Bockius LLP

(57) ABSTRACT

A brake device includes a brake pad, a pad thruster connected to the brake pad to linearly move the brake pad, and a caliper body provided with a cylinder space allowing the pad thruster to be seated therein. The pad thruster may include a conversion assembly configured to convert rotational motion into rectilinear motion, and at least two pistons connected to one end of the conversion assembly. The conversion assembly is seated in the cylinder space, and the at least two pistons are positioned outside of the cylinder space.

8 Claims, 10 Drawing Sheets

(56)     References Cited

U.S. PATENT DOCUMENTS

| | | | |
|---|---|---|---|
| 11,518,359 B2 | 12/2022 | Kwon | |
| 11,655,867 B2 * | 5/2023 | Lou | F16D 65/183 |
| | | | 188/72.4 |
| 2005/0173206 A1 * | 8/2005 | Reuter | F16D 65/18 |
| | | | 188/72.7 |
| 2013/0062149 A1 * | 3/2013 | Burgoon | B60T 13/741 |
| | | | 188/72.3 |
| 2014/0090934 A1 * | 4/2014 | Pritz | F16D 65/567 |
| | | | 188/72.4 |
| 2015/0122596 A1 * | 5/2015 | Ruopp | F16D 65/0068 |
| | | | 188/71.8 |
| 2015/0129371 A1 * | 5/2015 | Gutelius | F16D 55/228 |
| | | | 188/72.1 |
| 2016/0290424 A1 * | 10/2016 | Gutelius | F16D 65/183 |
| 2017/0167553 A1 * | 6/2017 | Sim | F16D 65/18 |
| 2017/0219036 A1 * | 8/2017 | Song | F16D 65/0075 |
| 2017/0291659 A1 * | 10/2017 | Nakakura | F16D 55/225 |
| 2019/0063527 A1 * | 2/2019 | Thomas | F16D 65/14 |
| 2020/0309213 A1 * | 10/2020 | Al-Mahshi | F16D 65/183 |
| 2020/0361437 A1 | 11/2020 | Esnee et al. | |
| 2021/0016760 A1 * | 1/2021 | Hong | F16D 55/226 |
| 2021/0222746 A1 * | 7/2021 | Tarandek | F16D 65/0068 |
| 2021/0364055 A1 * | 11/2021 | Lou | F16D 55/2265 |
| 2022/0266808 A1 | 8/2022 | Sala et al. | |
| 2022/0297654 A1 * | 9/2022 | Chelaidite | F16D 55/226 |
| 2022/0297660 A1 | 9/2022 | Lim et al. | |
| 2023/0016924 A1 * | 1/2023 | Gerber | F16D 55/226 |
| 2023/0036745 A1 | 2/2023 | Yamaguchi et al. | |

* cited by examiner

BRAKE DEVICE

This application claims the benefit of Korean Patent Application No. 10-2023-0050287, filed on Apr. 17, 2023, which is hereby incorporated by reference as if fully set forth herein.

BACKGROUND OF THE DISCLOSURE

Technical Field

Embodiments of the present disclosure relate to a brake device applicable to vehicles in any field, and more particularly, to a brake device connected to a brake disk of a vehicle.

Background

A brake device mounted on a vehicle, which is a device used to slow or stop a moving vehicle, or to keep a vehicle stationary, brakes the vehicle by strongly pressing a circular brake disk, which rotates along with the wheels of the vehicle, against brake pads on both sides.

In a conventional brake device, a brake pad is generally thrust by a single piston to press against the brake disk. In some cases, the brake pad is thrust by two or more pistons.

When a brake pad is thrust by multiple pistons, it is important for brake performance that the pistons are evenly pressurized. This is because the more evenly the pressure is distributed across the surface of the brake pad, the more evenly the brake pad may apply pressure to the brake disk. However, when uneven wear occurs on the brake pad, causing a slope on the pad surface, a difference in pressure may occur between multiple pistons. In this case, excessive pressure may be applied to a certain piston, increasing the likelihood of piston breakage and reducing brake performance.

Other factors, such as manufacturing tolerances of actuators that drive the pistons, may also cause excessive pressure to be applied to any one of the multiple pistons, which exacerbates the issue of uneven distribution of pressure across the brake pad surface.

The aforementioned issues affect the performance of the brake system, and there is a need for improved technology.

SUMMARY

Accordingly, embodiments of the present disclosure are directed to a brake device that substantially obviates one or more problems due to limitations and disadvantages of the related art.

Embodiments of the present disclosure provide a brake device that reduces the likelihood of breakage of pistons.

Embodiments of the present disclosure provide a brake device that provides improved surface pressure on the brake pads.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a brake device may include a brake pad, a pad thruster connected to the brake pad to linearly move the brake pad, and a caliper body provided with a cylinder space allowing the pad thruster to be seated therein, wherein the pad thruster may include a conversion assembly configured to convert rotational motion into rectilinear motion, and at least two pistons connected to one end of the conversion assembly. The conversion assembly may be seated in the cylinder space, and the at least two pistons may be positioned outside of the cylinder space.

The conversion assembly may include a bolt screw configured to rotate about an axis, and a movable nut connected to the bolt screw, wherein the movable nut may be moved along a longitudinal direction of the cylinder space by rotation of the bolt screw. The at least two pistons may be connected to a head of the movable nut.

The pad thruster may further include a pivotable linkage. The pivotable linkage may be pivotably connected to the head of the movable nut, and the at least two pistons may be connected to the pivotable linkage. The pivotable linkage may rotate about an axis extending in a vertical direction. Here, the at least two pistons may be symmetrically connected to the pivotable linkage.

The pivotable linkage and the head of the movable nut may be pivotably connected by a bolt fastened in a vertical direction, and resistance against pivoting of the pivotable linkage is based on a fastening torque of the bolt.

In a neutral position, a normal distance from an imaginary plane containing front surfaces of the at least two pistons to an end of the head of the movable nut may be greater than or equal to 2 mm.

The caliper body may include a stopper configured to prevent the pivotable linkage from rotating beyond a predetermined angle from the neutral position. The pivotable linkage may include a groove formed at a position to contact the stopper. At least a portion of the stopper may be inserted into the groove.

The caliper body may further include a heat dissipation hole. A width of the heat dissipation hole may be greater than a width of the bolt, and a length of the heat dissipation hole may be greater than a sum of the width of the bolt and two times an allowable amount of wear of the brake pad. The heat dissipation hole may be formed above the bolt along a direction of movement of the bolt.

In another aspect of the present disclosure, a brake device may include a brake pad, a pad thruster connected to the brake pad to linearly move the brake pad, and a caliper body provided with a cylinder space allowing the pad thruster to be seated therein. The pad thruster may include a bolt screw arranged in the cylinder space to rotate about an axis, a movable nut connected to the bolt screw, and a pivotable linkage pivotably connected to a head of the movable nut. The movable nut may be moved along a direction of the cylinder space by rotation of the bolt screw, and the pivotable linkage may rotate about a vertical axis extending through the head of the movable nut. At least two pistons may be connected to the pivotable linkage.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
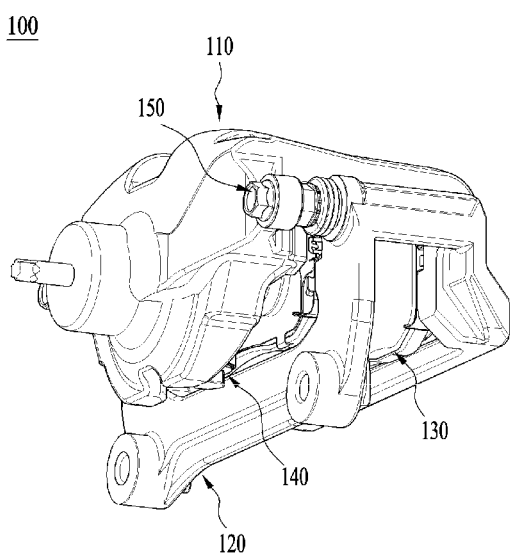
FIG. 1 is a perspective view of a brake device according to an embodiment of the present disclosure.
Figure 1:
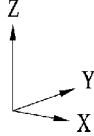
Figure 2:
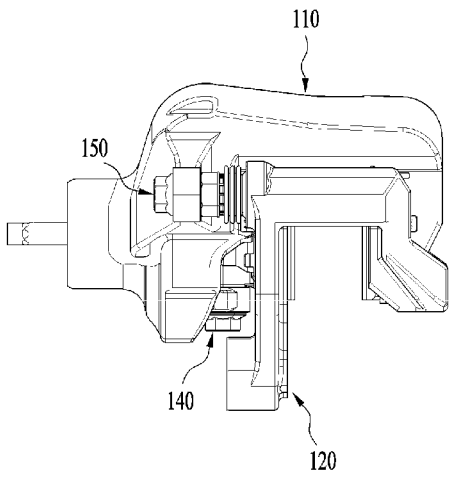
FIG. 2 is a side view of the brake device.
Figure 2:
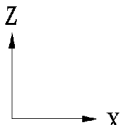
Figure 3:
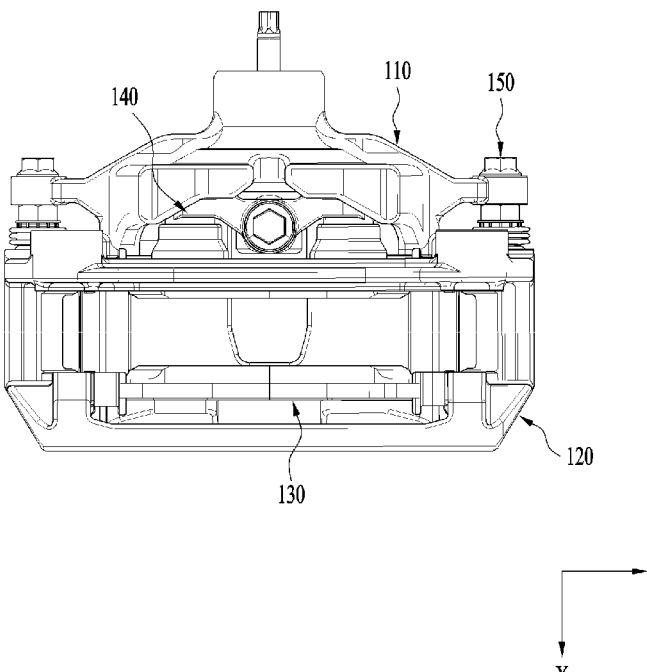
FIG. 3 is a bottom plan view of the brake device.

The advantages and features of the present disclosure and the manner of achieving the same will become apparent from the embodiments described in detail below with reference to the accompanying drawings. The present disclosure may, however, be embodied in many different forms and should not be construed as limited to the embodiments set forth herein. It should be understood that these embodiments are provided such that the disclosure will be thorough and complete, and will fully convey the concept of the present disclosure to those skilled in the art. The scope of the present disclosure is only defined by the claims.

The terminology used in this specification is intended to describe embodiments and is not intended to limit the present disclosure. As used herein, the singular forms "a," "an" and "the" include plural forms unless the context clearly indicates otherwise. The words "comprises" and/or "comprising" as used in the specification do not exclude the presence or addition of one or more other components in addition to the recited components. Throughout the specification, the same reference numerals refer to the same components, and the term "and/or" includes each and every combination of one or more of the recited components. Although the terms "first," "second," and the like are used to describe various components, the components are not limited by these terms. These terms are used merely to distinguish one component from another. Accordingly, it will be appreciated that a first component referred to herein may also be referred to as a second component within the scope of the present disclosure.

Unless otherwise defined, all terms used herein (including technical and scientific terms) are intended to have the meaning commonly understood by one of ordinary skill in the art to which the present disclosure belongs. Terms defined in commonly used dictionaries are not to be interpreted in an idealized or overly formal sense unless explicitly and specifically defined.

Spatially relative terms such as "below," "beneath," "lower," "above," "upper," and the like may be used to facilitate describing the relationship of one component to other components as shown in the drawings. The spatially relative terms should be understood as including different orientations of the components in use or operation in addition to the orientations shown in the drawings. For example, a component described as "below" or "beneath" another component may be placed "above" the other component if the components shown in the drawings are reversed. Thus, the exemplary term "below" or "beneath" may include orientations of both below and above. Components may also be oriented in other directions, and thus spatially relative terms may be interpreted according to the orientations.

FIGS. 1, 2, 3, and 4 are a perspective view, a side view, a bottom plan view, and a top plan view of a brake device 100 (hereinafter referred to as a "brake device"), respectively, according to an embodiment of the present disclosure. The brake device 100 applies braking to a wheel by pressing a surface of a brake disk (not shown) of a vehicle with a brake pad 130. During travel of the vehicle, the brake disk rotates with the wheels. When the brake device 100 applies pressure to the brake disk, it may resist rotation of the brake disk, thereby reducing the rotational speed of the wheels.

Referring to FIGS. 1 to 4, the brake device 100 includes a caliper body 110 and a pad carrier 120. The brake device 100 also includes a brake pad 130, a pad thruster 140, and a connecting pin 150.

The caliper body 110 is a body capable of connecting the components of the brake device 100. The caliper body 110 may be formed in a shape similar to a square bracket shape, such that a portion of the brake disk may be located in a recessed area. The caliper body 110 may have the brake pad 130 located therein to press against both sides of the brake disk. Further, the caliper body 110 may include a cylinder space in which the pad thruster 140 that thrusts the brake pad 130 is seated. The cylinder space is formed to accommodate at least a portion of the pad thruster 140.

The material and shape of the caliper body 110 may vary depending on the positions and loads of the other components. The material of the caliper body 110 may include a metallic material. The caliper body 110 may be formed of a metallic material having appropriate strength to support a reaction force against the brake clamping force.

The pad carrier 120 is connected to the caliper body 110 by the connecting pin 150 and is connected to both surfaces of the brake pad 130 to guide movement of the brake pad 130. The brake pad 130 is provided with protrusions on both surfaces, and the pad carrier 120 is provided with grooves corresponding to the protrusions, such that the protrusions of the brake pad 130 may be inserted into the grooves of the pad carrier 120.

The grooves in the pad carrier 120 extend along the direction in which the brake pad 130 moves to apply pressure to the brake disk (e.g., a direction parallel to the x-axis in the figures). Thus, the brake pad 130 may move as the protrusions on both surfaces are guided by the pad carrier 120.

The pad carrier 120 may be connected to a fixed component, such as a knuckle (not shown) for a vehicle wheel. Also, the caliper body 110 connected to the pad carrier 120 may be moved as it is guided in a longitudinal direction of the connecting pin 150. For example, during a braking operation, the caliper body 110 may be moved by the reaction force of the brake pad 130 applying pressure to the brake disk. The longitudinal direction of the connecting pin 150 is parallel to the direction in which the brake pad 130 is thrust.

The pad carrier 120 may be formed of a metallic material having appropriate strength to support the braking torque acting on the brake pad 130.

The brake pad 130 may include a pad that directly contacts the brake disk to cause friction, and a back plate connected to one surface of the pad. The brake pads 130 may include multiple brake pads, wherein a first brake pad may press against one surface of the brake disk and a second brake pad may press against an opposite surface of the brake disk. A pair of brake pads 130 may be disposed face to face with the brake disk positioned therebetween.

Although not shown, the brake device 100 may include a motor configured to drive the pad thruster 140 and a gear part including gears connected to the motor. The operation of the motor may be controlled based on an electrical signal. When the motor is operated, rotational motion of the motor may be transmitted to the pad thruster 140 via the gear part.

The gear part may include an assembly of a plurality of gears to transmit rotational motion of the motor. The plurality of gears is connected to a motor gear. The type, number, location, and size of the plurality of gears may include a variety of structures designed by those of ordinary skill in the art. The plurality of gears may include combinations of various gear types, such as a spur gear, a helical gear, and a worm gear.

Figure 5:
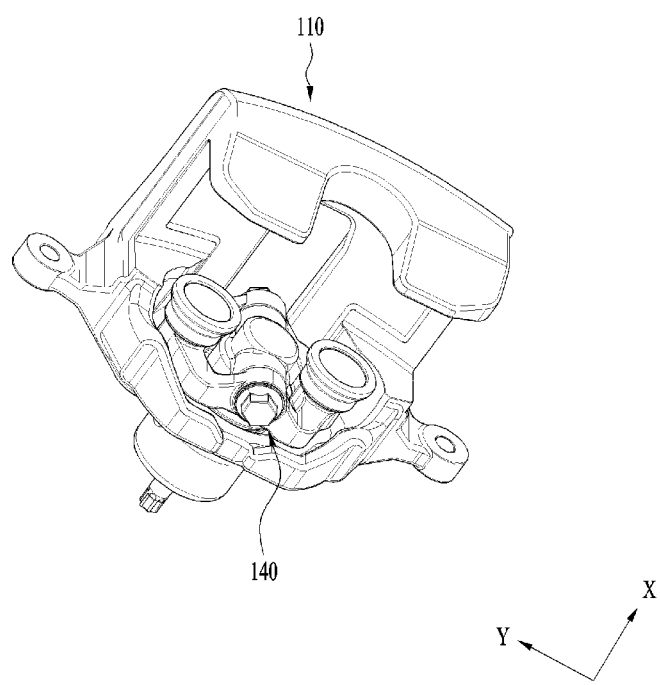
FIG. 5 illustrates a caliper body and a pad thruster of the brake device.

FIG. 5 illustrates the caliper body 110 having the pad thruster 140 mounted. In FIG. 5, unnecessary components other than those to be described are omitted. Referring to FIG. 5, at least a portion of the pad thruster 140 is inserted and positioned in the cylinder space of the caliper body 110. Specifically, a bolt screw 143 and a movable nut 142 among the components constituting the pad thruster 140 may be partially positioned in the cylinder space.

Figure 6:
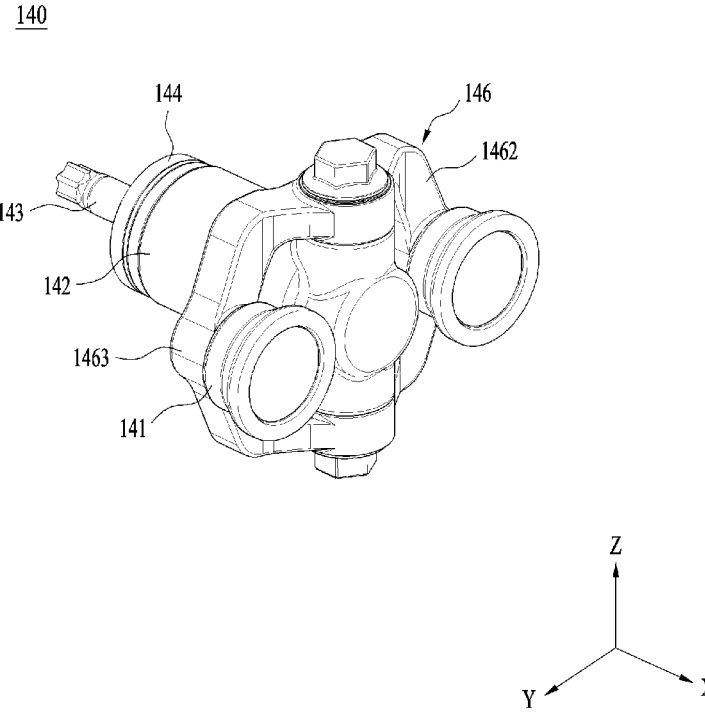
FIG. 6 is a perspective view of the pad thruster of the brake device.
Figure 7:
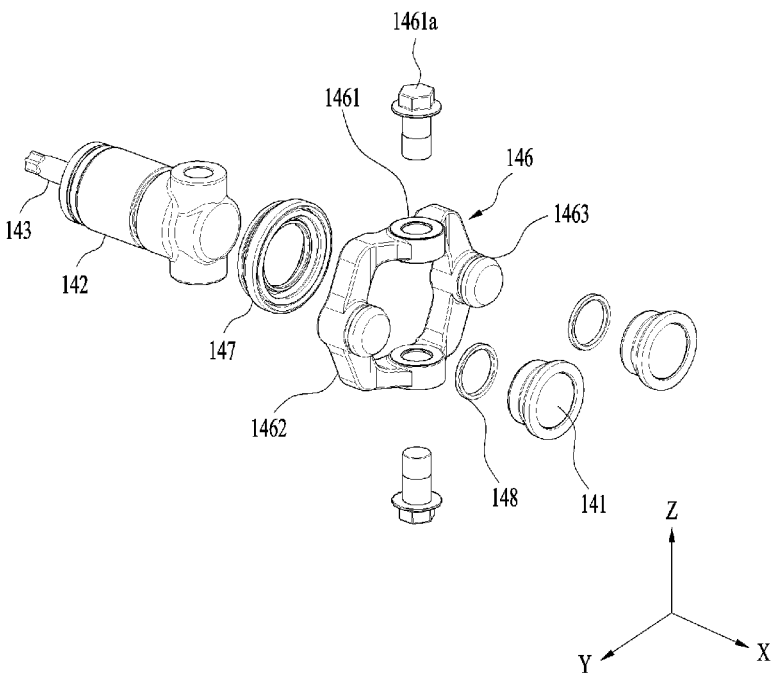
FIG. 7 is an exploded view of the pad thruster.
Figure 8:
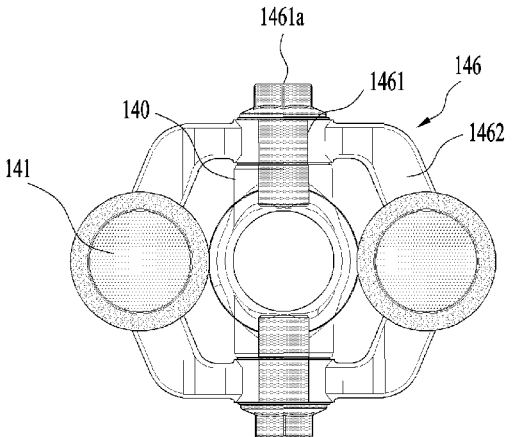
FIG. 8 is a side view of the pad thruster.
Figure 8:
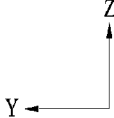

FIG. 6 is a perspective view of the pad thruster 140, FIG. 7 is an exploded view of the pad thruster 140, and FIG. 8 is a side view of the pad thruster 140.

The pad thruster 140 may move the brake pad 130 with power transmitted from the gear part. Referring to FIGS. 5 to 8, the pad thruster 140 includes a piston 141, a conversion assembly including the movable nut 142 and the bolt screw 143, and/or a pivotable linkage 146. The pad thruster 140 may be referred to as an actuator.

The conversion assembly may represent a variety of components capable of converting the rotational motion of the gears to rectilinear motion, as well as connections between the components. For example, in this embodiment, the conversion assembly includes the bolt screw 143 and the movable nut 142 corresponding thereto. The conversion assembly may be seated in the cylinder space formed in the caliper body 110. The cylinder space may be a cylindrical space in which the movable nut 142 is movable.

The bolt screw 143 engages with a gear connected to the motor and rotates about an axis. The bolt screw 143 may be oriented in an axial direction (e.g., parallel to the x-axis) at the center of the cylinder space. The axial direction of the bolt screw 143 is parallel to the direction in which the brake pad 130 moves (advances or retracts). The bolt screw 143 is positioned in the cylinder space of the caliper body 110 and rotates in place. Although not shown, the bolt screw 143 includes a spiral screw (thread) on an outer surface thereof.

The movable nut 142 may have a screw corresponding to the screw of the bolt screw 143, and may be connected to the bolt screw 143 to move forward or backward depending on the direction of rotation of the bolt screw 143. The movable nut 142 connected to the bolt screw 143 may protrude out of the cylinder space or be retracted into the cylinder space while moving. The movable nut 142 may move along the longitudinal direction of the cylinder space.

The movable nut 142 is formed to be long enough that the head of the movable nut 142 protrudes out of the cylinder space even when the movable nut 142 is fully inserted into the cylinder space. In other words, the length of the movable nut 142 may be greater than the depth of the cylinder space. When a bearing is positioned inside the cylinder space, the length L of the moving nut 142 is greater than the depth D of the cylinder space minus the thickness W of the bearing, i.e., L>(D−W).

The pad thruster 140 may further include a bearing 144 connected to the bolt screw 143. The bearing 144 may include one or more bearings, and may be positioned behind the tail portion of the movable nut 142. The bearing 144 may include a screw bearing and may maintain the bolt screw 143 at a constant position.

The movable nut 142 is partially located inside the cylinder space, and movement of the movable nut 142 is guided by the direction in which the cylinder space is formed. The movable nut 142 may be referred to as a ball screw nut, and the structure of the bolt screw 143 and the movable nut 142 may be referred to as a ball screw structure.

Referring to FIGS. 6 to 8, the pad thruster 140 includes the pivotable linkage 146. The pivotable linkage 146 may be pivotably connected to the head of the movable nut 142, and the pivotable linkage 146 may pivot about the z-axis (vertical direction) as the axis of rotation.

Specifically, the pivotable linkage 146 may include a rotary portion 1461, a connecting arm 1462, and a piston retainer 1463. The rotary portion 1461 is connected to the movable nut 142 by a bolt 1461a. For example, the head of the rotary portion 1461 and the movable nut 142 may each include an assembly hole formed in the z-axis direction (vertical direction), and the bolt 1461a may be inserted through the assembly hole in the vertical direction to connect the two components such that the components are pivotable about the axis. The bolt 1461a is secured to the movable nut 142, and the assembly hole in the rotary portion 1461 has a diameter slightly larger than the outer diameter of the bolt 1461a. Thus, the rotary portion 1461 may rotate about the bolt 1461a. Other arrangements may be employed by those of ordinary skill in the art as to the manner in which the rotary portion 1461 and the movable nut 142 are pivotably connected to each other.

The rotary portion 1461 may be subjected to frictional resistance based on the fastening torque of the bolt 1461a. When the fastening torque of bolt 1461a increases, the rotary portion 1461 and the movable nut 142 are more strongly coupled, and more friction is generated when the rotary portion 1461 rotates. Accordingly, by adjusting the fastening torque of bolt 1461a, the resistance to rotation of the rotary portion 1461 may be adjusted. When the fastening torque of the bolt 1461a is excessively low, the pivotable linkage 146 may easily rotate, making it difficult to provide appropriate thrust to the brake pad 130. Thus, one of ordinary skill in the art may adjust the fastening torque of the bolt 1461a to provide appropriate resistance to rotation of the pivotable linkage 146.

A washer may be additionally provided between the head of the bolt 1461a and the rotary portion 1461 to facilitate the relative behavior of the two components. A washer may also be included between the rotary portion 1461 and the head of the movable nut 142. The washer prevents foreign material from being introduced into the assembly hole and smooths the rotation of the pivotable linkage 146. Additionally, a bush may be applied to the outer circumference of the bolt 1461a. The bush may be applied when damping is required for robustness to noise inside the assembly hole.

The piston retainer 1463 is a component connected to the piston 141. The pivotable linkage 146 may include a plurality of piston retainers 1463. The plurality of piston retainers 1463 may be connected to a plurality of pistons 141, respectively. The plurality of pistons 141 may be symmetrically connected with respect to a center of a face of the brake pad 130 to transmit braking force to the brake pad 130.

The connecting arm 1462 is a member connecting the rotary portion 1461 and the piston retainer 1463. One end of the connecting arm 1462 is connected to the rotary portion 1461, and the opposite end of the connecting arm 1462 is connected to the piston retainer 1463. The connecting arm 1462 is formed symmetrically about a central axis about which the rotary portion 1461 rotates. Specifically, the connecting arm 1462 may be formed symmetrically with respect to an xz-plane having the axis of rotation of the rotary portion 1461. In other words, the connecting arm 1462 may be formed symmetrically with respect to an imaginary vertical plane (i.e., the xz-plane) that passes through the center of the brake pad 130 and is perpendicular to the face of the brake pad 130. Further, the connecting arm 1462 may be formed symmetrically with respect to the vertical plane (i.e., the xz-plane) that includes the axis of rotation of the bolt screw 143 and the axis of rotation of the rotary portion 1461.

Additionally, the connecting arm 1462 may be formed symmetrically with respect to an imaginary horizontal plane (i.e., the xy-plane) that includes the center of the brake pad 130 and is perpendicular to the face of the brake pad 130. Alternatively, the connecting arm 1462 may be symmetrically formed with respect to a horizontal plane (i.e., the xy-plane) that includes the axis of rotation of the bolt screw 143 and is perpendicular to the axis of rotation of the rotary portion 1461.

The plurality of pistons 141 may be symmetrically connected to the pivotable linkage 146, according to the shape of the connecting arm 1462. Thus, the plurality of pistons 141 may exert a uniform force against the face of the brake pad 130.

The specific shape of the connecting arm 1462 may be appropriately modified by one of ordinary skill in the art. Once the positions of the plurality of pistons 141 connected to the brake pad 130 to thrust the brake pad 130 are designed, the positions of the plurality of piston retainers 1463 connected to each of the plurality of pistons 141 are defined, and the connecting arm 1462 is formed to connect the plurality of piston retainers 1463 to the rotary portion 1461. The connecting arm 1462 is formed of a member having an appropriate strength in consideration of the force that presses the brake pad 130.

The piston 141 is connected to the brake pad 130 at one end and to the piston retainer 1463 at an opposite end to transmit the movement of the movable nut 142 to the brake pad 130. The shape of the piston 141 may include a cylindrical shape with an open end, and may be connected to the piston retainer 1463 via the open end. The piston retainer 1463 is connected to the piston 141 by a protruding portion thereof inserted through the open end of the piston 141. Thus, when the movable nut 142 moves forward or backward, the pivotable linkage 146 connected to the movable nut 142 moves forward or backward, and the plurality of pistons 141 connected to the pivotable linkage 146 also moves forward or backward together with the brake pad 130. Here, the pistons 141 are not inserted into the cylinder space and are located outside of the cylinder space.

The protruding portion of the piston retainer 1463 may include a curved surface, and the piston 141 may include a curved surface corresponding to one side close to the protruding portion of the piston retainer 1463. For example, when the protruding portion of the piston retainer 1463 includes a convex curved surface, the corresponding side of the piston 141 may include a concave curved surface. The curved surface of the piston retainer 1463 and the curved surface of the piston 141 may contact each other face to face.

The curved surface of the piston retainer 1463 and the curved surface of the piston 141 may be spaced from each other by a predetermined distance in a neutral state. Thus, the piston 141 may be capable of flexible movement within the range allowed by the predetermined distance. The axial direction of the piston 141 may be slightly inclined with respect to the axial direction of the movable nut 142. Accordingly, the piston 141 may have flexibility while maintaining connectivity with the piston retainer 1463.

A seal part 148 is configured to seal the gap between the piston 141 and the piston retainer 1463. The seal part 148 prevents foreign substances from being introduced into the piston 141.

The piston retainer 1463 includes a first groove formed along the circumference of the protruding portion, and the piston 141 includes a second groove on an inner surface thereof that corresponds in position to the first groove. When the piston 141 and the piston retainer 1463 are connected, the first groove and the second groove face each other. The first groove and the second groove provide a space in which the seal part 148 may be positioned. Thus, the seal part 148 may be positioned in the space defined by the first groove of the piston retainer 1463 and the second groove of the piston 141. The seal part 148 may have a shape formed according to the space defined by the first groove of the piston retainer 1463 and the second groove of the piston 141, and may include a ring shape. The shape of the seal part 148 may vary depending on the cross-sectional shape of the piston retainer 1463. Further, the cross-section of the seal part 148 may have a rectangular or circular shape, and the groove shape of the first groove and the second groove may change according to the shape of the cross section of the seal part 148. The seal part 148 may include parts and materials commonly used for sealing. The seal part 148 seals the gap between piston retainer 1463 and the piston 141 while connecting the piston retainer 1463 and the piston 141 such that the piston retainer 1463 and the piston 141 are not separated from each other.

In another embodiment, the piston retainer 1463 and the piston 141 may be connected by caulking.

A boot 147 closes the gap between the outer wall surrounding the cylinder space in the caliper body 110 and the outer surface of the movable nut 142 to prevent the introduction of foreign substances from the outside.

The caliper body 110 includes a third groove formed along the edge of the opening in the cylinder space, and the movable nut 142 includes a fourth groove formed along the outer circumferential surface thereof. The fourth groove is positioned outside of the cylinder space. One end of the boot 147 is inserted and secured in the third groove, and the opposite end of the boot 147 is inserted and secured in the fourth groove. The boot 147 is provided with a plurality of layered folds to be flexibly deformed according to changes in the position of the movable nut 142 and to prevent foreign substances from entering the gap between the movable nut 142 and the wall of the cylinder space.

Figure 9:
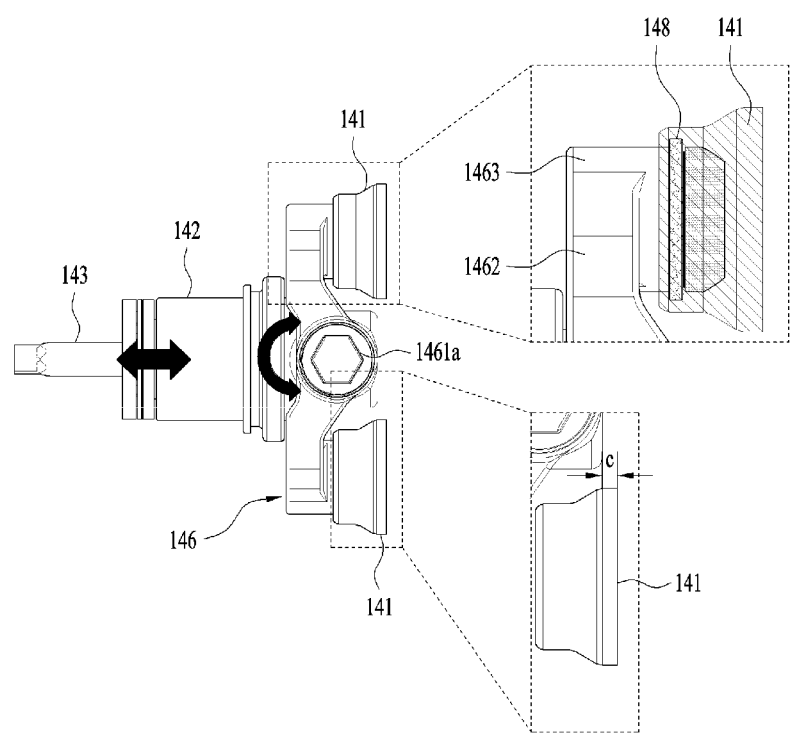
FIG. 9 is a top plan view and partially enlarged view of the pad thruster.

FIG. 9 is a top plan view and partially enlarged view of the pad thruster 140.

Referring to FIG. 9, the movable nut 142 is moved rectilinearly by rotation of the bolt screw 143, and the pivotable linkage 146 and the movable nut 142 are pivotably connected by the bolt 1461a. Thus, even if the brake pad 130 is not exactly perpendicular to the face of the brake disk due to uneven wear of the brake pad 130 or manufacturing tolerances, the pivotable linkage 146 may be rotated to bring the face of the brake pad 130 into uniform contact with the face of the brake disk.

In order to allow the pivotable linkage 146 to rotate by a predetermined angle, the vertical distance c between the plane including the front surface of the piston 141 and the plane which includes the end of the head of the movable nut 142 and is perpendicular to the axis of rotation of the bolt screw 143 is set to be greater than or equal to 2 mm. In other words, the normal distance from the imaginary plane including the front surfaces of the plurality of pistons 141 in the neutral state to the end of the head of the movable nut 142 is greater than or equal to 2 mm. Accordingly, even when the brake pad 130 is inclined by a predetermined angle according to rotation of the pivotable linkage 146, the rear surface of the brake pad 130 does not contact the head of the movable nut 142.

Figure 4:
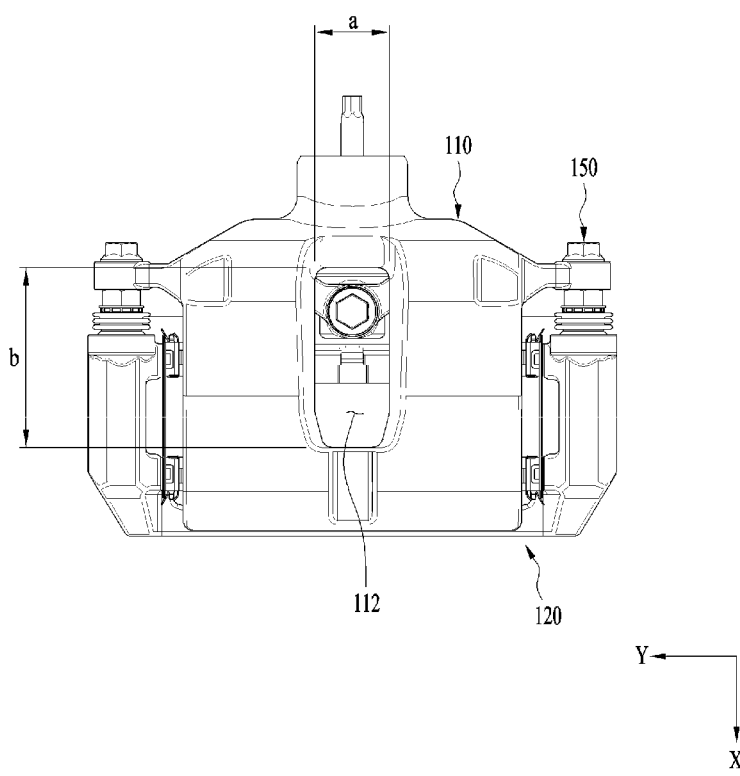
FIG. 4 is a top plan view of the brake device.

Referring to FIG. 4, the caliper body 110 may include a heat dissipation hole 112. The heat dissipation hole 112 is a through-hole formed through the caliper body 110 to allow heat dissipated from the bolt 1461a to be easily transferred to the outside.

As shown in FIG. 4, the width of the heat dissipation hole 112 may be defined as a, and the length of the heat dissipation hole 112 may be defined as b. Here, a is at least greater than the outermost diameter of the head of the bolt 1461a, and b is greater than the sum of the outermost diameter of the head of the bolt 1461a and two times the allowable amount of wear of the brake pad 130, i.e., b>outermost diameter of the head of the bolt+(allowable amount of wear*2).

The heat dissipation hole 112 is positioned above the bolt 1461a, and may be disposed in a direction parallel to the direction in which the bolt 1461a moves.

The caliper body 110 may include a heat dissipation hole 112 that is a through-hole having a width greater than the width of the bolt 1461a and a length greater than the sum of two times the allowable amount of wear of the brake pad 130 and the width of the bolt 1461a, wherein the heat dissipation hole 112 may be positioned above the bolt 1461a and formed along the direction of movement of the bolt 1461a.

Figure 10:
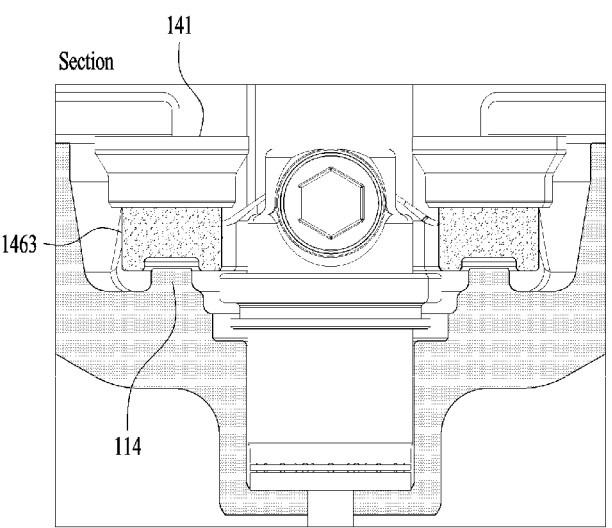
FIG. 10 is a cross-sectional view of the pad thruster mounted in the caliper body.
Figure 10:
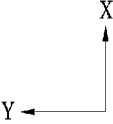

FIG. 10 is a cross-sectional view of a pad thruster 140 mounted in the caliper body 110.

Referring to FIG. 10, the caliper body 110 further includes a stopper 114 configured to prevent the pivotable linkage 146 from rotating beyond a predetermined angle in the neutral state. The stopper 114 protrudes from a surface of the caliper body 110 located behind the piston retainer 1463. Accordingly, when the pivotable linkage 146 is rotated by a predetermined angle and the piston retainer 1463 comes into contact with the stopper 114, the pivotable linkage 146 is not allowed to rotate beyond the angle. Additionally, the piston retainer 1463 may include a groove into which at least a portion of the stopper 114 may be inserted.

In the case where the pad of the brake pad 130 is worn asymmetrically, the brake pad 130 is subjected to an external force that causes the brake pad 130 to tilt due to the tilt of the unevenly worn surface of the pad when applying pressure to the brake disk. However, in the case of the brake device 100 according to the embodiment, the brake pad 130 may be slightly tilted, and therefore the magnitude of the external force applied to the piston 141 or the movable nut 142 may be greatly reduced, and the possibility of breakage may be reduced.

Further, the pivotable linkage 146 is rotatable on the head of the movable nut 142. Accordingly, when multiple pistons 141 are used, the difference in the applied pressure between the pistons 141 may be minimized. Therefore, even when there is an issue such as an orientation error of the movable nut due to uneven wear of the brake pad 130 or manufac-turing tolerances, pressure may be evenly applied to the brake pad 130 due to the pivotable linkage 146.

In addition, the gap between the piston retainer 1463 and the piston 141 may improve the return performance of the brake pad 130 and prevent the piston 141 from bumping due to vibration of the vehicle. Accordingly, the noise from the device may be reduced and durability of the device may be improved.

Further, since the brake device 100 is capable of integrally moving multiple pistons by one conversion assembly, the manufacturing cost may be reduced, the weight may be reduced, and the surface pressure of the brake pad 130 may be improved.

The brake device 100 may improve the surface pressure of the brake pad 130 by applying multiple pistons to the single brake pad 130. Since the size of the piston can be reduced regardless of the caliper body 110, the surface pressure of the brake pad 130 may be improved to be uniform by applying multiple pistons.

As is apparent from the above description, the present disclosure has effects as follows.

According to an embodiment of the present disclosure, the likelihood of breakage of the pistons of a brake device may be reduced.

Furthermore, according to an embodiment of the present disclosure, the surface pressure exerted on the brake pads may be improved.

Furthermore, according to an embodiment of the present disclosure, the utilization of a brake pad connected to multiple pistons may be increased.

The effects obtainable from the present disclosure are not limited to those mentioned above, and other effects not mentioned will be apparent to one having ordinary skill in the art from the following description.

The description of various embodiments of the present disclosure is not limited to such embodiments, and it will be appreciated that the technical ideas of each embodiment as applied in the various embodiments may be applied to other embodiments.

Preferred embodiments of the present disclosure have been described in detail above to allow those skilled in the art to implement and practice the present disclosure. Although the preferred embodiments of the present disclosure have been described above, those skilled in the art will appreciate that various modifications and variations may be made in the present disclosure without departing from the spirit or scope of the disclosure. For example, those skilled in the art may use a combination of elements set forth in the above-described embodiments.

The present disclosure is not limited to the embodiments described herein, but is intended to have the widest scope consistent with the principles and novel features disclosed herein.

What is claimed is:

1. A brake device comprising:
a brake pad;
a pad thruster connected to the brake pad to linearly move the brake pad; and
a caliper body provided with a cylinder space allowing the pad thruster to be seated therein,
wherein the pad thruster comprises:
a conversion assembly configured to convert rotational motion into rectilinear motion; and
at least two pistons connected to one end of the conversion assembly,
wherein the conversion assembly is seated in the cylinder space, wherein the at least two pistons are positioned outside of the cylinder space, wherein the conversion assembly comprises:

a bolt screw configured to rotate about an axis; and a movable nut connected to the bolt screw, wherein the movable nut is moved along a longitudinal direction of the cylinder space by rotation of the bolt screw, wherein the at least two pistons are connected to a head of the movable nut, wherein the pad thruster further comprises a pivotable linkage rotatable about an axis extending in a vertical direction, and wherein the pivotable linkage and the head of the movable nut are pivotably connected by a bolt fastened in the vertical direction.

2. The brake device of claim 1, wherein the at least two pistons are connected to the pivotable linkage.

3. The brake device of claim 2, wherein the at least two pistons are symmetrically connected to the pivotable linkage.

4. The brake device of claim 1, wherein resistance against pivoting of the pivotable linkage is based on a fastening torque of the bolt.

5. The brake device of claim 1, wherein, in a neutral position, a normal distance from an imaginary plane containing front surfaces of the at least two pistons to an end of the head of the movable nut is greater than or equal to 2 mm.

6. The brake device of claim 5, wherein the caliper body comprises:

a stopper configured to prevent the pivotable linkage from rotating beyond a predetermined angle from the neutral position.

7. The brake device of claim 6, wherein the pivotable linkage comprises:

a groove disposed at a position to contact the stopper, the groove allowing at least a portion of the stopper to be inserted thereinto.

8. The brake device of claim 1, wherein the caliper body further comprises a heat dissipation hole, wherein a width of the heat dissipation hole is greater than a width of the bolt, wherein a length of the heat dissipation hole is greater than a sum of the width of the bolt and two times an allowable amount of wear of the brake pad, and wherein the heat dissipation hole is disposed above the bolt along a direction of movement of the bolt.

* * * * *